United States Patent
Torii et al.

(10) Patent No.: US 6,382,384 B2
(45) Date of Patent: May 7, 2002

(54) CLUTCH HAVING REDUCED NOISE LEVEL AND MOTOR INCLUDING SUCH CLUTCH

(75) Inventors: Katsuhiko Torii, Hamamatsu; Hiroaki Yamamoto, Kosai, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/767,858

(22) Filed: Jan. 24, 2001

(30) Foreign Application Priority Data

Feb. 2, 2000 (JP) ........................................ 2000-025193

(51) Int. Cl.[7] ............................ F16D 41/06; F16H 1/16; B60J 1/17; E05F 15/10
(52) U.S. Cl. ...................................... 192/223.2; 310/78
(58) Field of Search ............................... 192/223.2, 38, 192/44, 45, 223, 27, 69.5; 310/78, 75 ALL, 77

(56) References Cited

U.S. PATENT DOCUMENTS 6,229,233 B1 * 5/2001 Torii et al. .................... 310/78

6,288,464 B1 * 9/2001 Torii et al. ................ 192/223.2

FOREIGN PATENT DOCUMENTS

WO     WO 00/08349    * 2/2000

* cited by examiner

*Primary Examiner*—Douglas C. Butler
(74) *Attorney, Agent, or Firm*—Law Offices of David G. Posz

(57) ABSTRACT

A clutch includes an outer ring, a driving-side rotator, a driven-side rotator and rolling elements. Each rolling element is located between an inner circumferential surface of the ring and a corresponding control surface of the driven-side rotator and has a diameter shorter than a distance between a circumferential center portion of the control surface and the inner circumferential surface of the ring but longer than a distance between each of opposing circumferential end portions of the control surface and the inner circumferential surface of the ring. The center portion is located radially outward of a straight line that connects the end portions. Each intermediate portion positioned between the center portion and the end portion is arcuately bulged beyond a straight line that connects the center portion and the end portion.

20 Claims, 10 Drawing Sheets

CLUTCH HAVING REDUCED NOISE LEVEL AND MOTOR INCLUDING SUCH CLUTCH

CROSS REFERENCE TO RELATED APPLICATION

This application is based on and incorporates herein by reference Japanese Patent Application No. 2000-25193 filed Feb. 2, 2000.

BACKGROUND OF THE INVENTION

The present invention relates generally to a clutch and, more particularly, to a clutch that prevents transmission of a rotational force from its driven side to its driving side and also a motor having such a clutch.

PCT publication No. WO00/08349 published on Feb. 17, 2000 proposes a clutch that prevents transmission of a rotational force from the driven side to the driving side.

This clutch includes an outer ring, a driving-side rotator, a driven-side rotator and rolling elements. The driving-side rotator is rotatably received within the outer ring and is connected to a drive source. The driving-side rotator includes engaging slots having an opening on its outer circumferential side (inner circumferential side of the outer ring).

The driven-side rotator is rotatably received within the outer ring and is connected to a load. The driven-side rotator has engaging projections for rotatably engaging with the corresponding engaging slot of the driving-side rotator. A control surface opposing an inner circumferential surface of the outer ring is provided on an outer circumferential surface of each engaging projection.

Within the opening of each engaging slot, the corresponding rolling element is positioned between the inner circumferential surface of the outer ring and the control surface. The rolling element has a diameter that is smaller than a distance between a circumferential center portion of the control surface and the inner circumferential surface of the outer ring but is longer than a distance between each of opposing circumferential end portions of the control surface and the inner circumferential surface of the outer ring.

In this clutch, when the driving-side rotator is rotated, each rolling element is urged by an inner wall surface of the opening of the corresponding engaging slot and is substantially positioned in the center portion of the control surface. The rotational force of the driving-side rotator is conducted from each engaging slot to the driven-side rotator via the corresponding engaging projection.

When the driven-side rotator is rotated, each rolling element is urged by the control surface against the inner circumferential surface of the outer ring and is clamped between the inner circumferential surface of the outer ring and the control surface to prevent rotation of the driven-side rotator.

The control surface of the above-described clutch should be formed such that a distance between the control surface and the outer ring decreases from the circumferential center portion toward the opposing circumferential end portions. In the above-described clutch, the center portion of the control surface is located radially inward (closer to the rotational center) of a straight line connecting the opposing circumferential end portions, and part of the control surface between the center portion and each one of the circumferential end portions is flat. Alternatively, the entire control surface may be in a single flat surface.

In the above-described clutch, it is difficult to make a small radial gap between the rolling element and the opposing circumferential center portion of the control surface as well as between the rolling element and the opposing inner circumferential surface of the outer ring. If these gaps are further reduced, a slight movement of the rolling element out of the center portion causes the rolling element to be clamped between the control surface and the inner circumferential surface of the outer ring. Furthermore, when the driving-side rotator is rotated, the rolling element may not be accurately positioned in the center portion, so that the rotation of the driving-side rotator may be prevented. On the other hand, if these gaps are further increased, the rolling element is allowed to move substantially in a radial direction when the driving-side rotator is rotated. This radial movement of the rolling element causes generation of noises.

Also, in the above-described clutch, when the rolling element is urged by the circumferential end portion of the control surface against the inner circumferential surface of the outer ring, a radially outwardly directed force component of the urging force exerted by the circumferential end portion cannot be sufficiently increased. Thus, when the driven-side rotator is rotated, the rolling element may not be clamped between the control surface and the inner circumferential surface of the outer ring. That is, the rolling element may move along the inner circumferential surface of the outer ring.

SUMMARY OF THE INVENTION

Thus, it is an objective of the present invention to provide a clutch having a reduced noise level as well as a motor having such a clutch.

It is another objective of the present invention to provide a clutch which is capable of preventing transmission of a rotational force from its driven-side to its driving-side as well as a motor having such a clutch.

To achieve the objective of the present invention, there is provided a clutch including an outer ring, a driving-side rotator, a driven-side rotator and a rolling element. The outer ring is non-rotatably secured and has an inner circumferential surface. The driving-side rotator is connected to a drive source and is rotatably received within the outer ring. The driving-side rotator includes an engaging slot that has an opening at its outer circumferential side. The driven-side rotator is connected to a load and is rotatably received within the outer ring. The driven-side rotator includes an engaging projection, which engages the engaging slot to limit relative rotation of the driving-side rotator within a predetermined range and which has a control surface opposing the inner circumferential surface of the outer ring at its outer circumferential wall surface.

The rolling element is located between the inner circumferential surface of the outer ring and the control surface in the opening and that has a diameter shorter than a distance between a circumferential center portion of the control surface and the inner circumferential surface of the outer ring but longer than a distance between each of opposing circumferential end portions of the control surface and the inner circumferential surface of the outer ring. Specifically, the circumferential center portion of the control surface is located radially outward of a straight line that connects the opposing circumferential end portions of the control surface. Each intermediate portion positioned between the circumferential center portion and a respective one of the circumferential end portions is arcuately bulged in a radially outward direction beyond a corresponding straight line that connects the circumferential center portion and a corresponding one of the circumferential end portions.

Furthermore, to achieve the objective of the present invention, there is also provided a motor having the above-described clutch.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENT

One embodiment of the present invention will be described with reference to a power window system shown in FIGS. 1 to 12.

Figure 12:
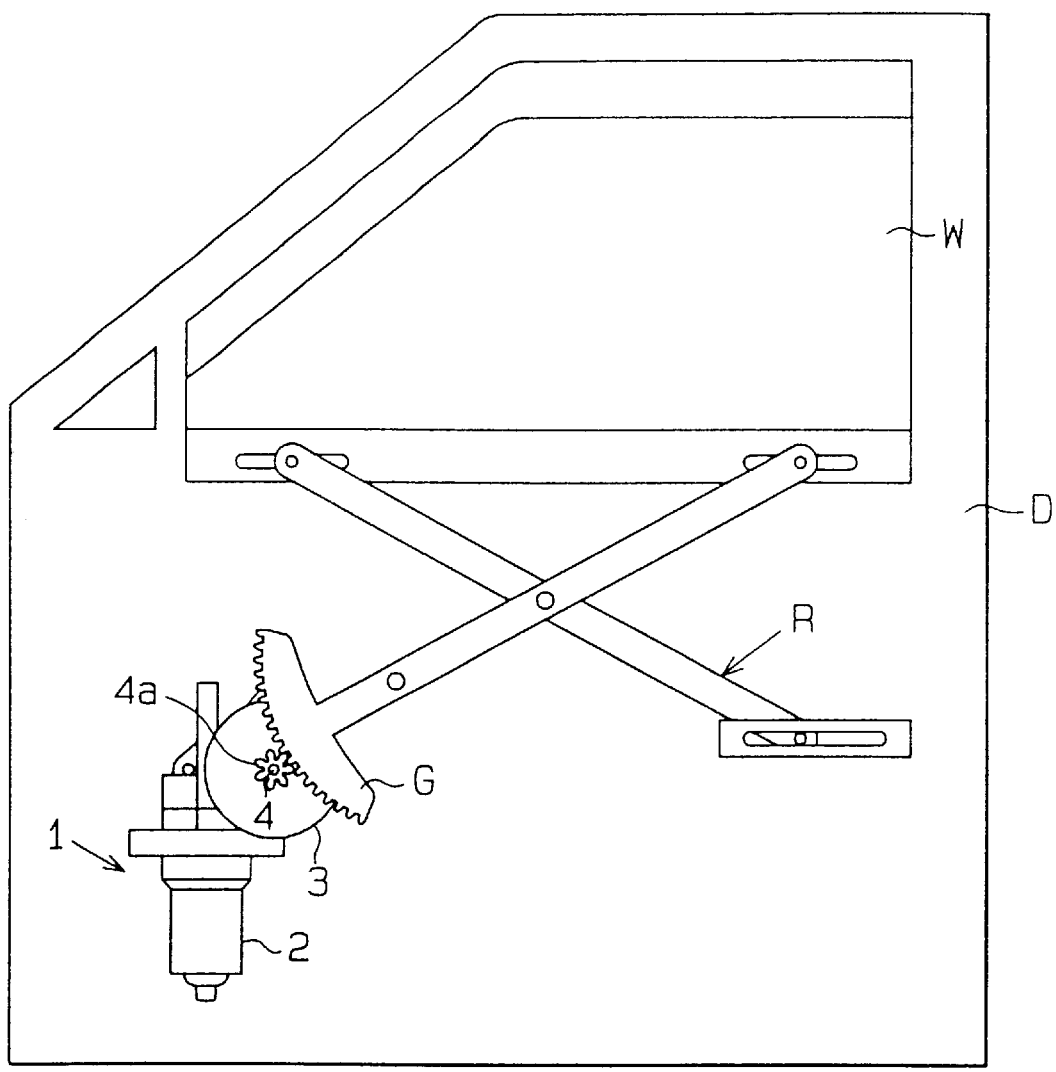
FIG. 12 is a schematic side view of a power window system according to the embodiment.

As shown in FIG. 12, a motor 1 of the power window system is secured to a vehicle door D. The motor 1 has a motor main body 2 and an output unit 3. The motor main body 2 rotates a gear 4a secured to an output shaft 4 of the output unit 3 in a forward or backward rotational direction. The gear 4a meshes with a gear G provided on a window regulator R of an X-arm type. Thus, when the gear 4a is rotated forward or backward, the window regulator R moves a window glass W up and down, respectively.

Figure 1:
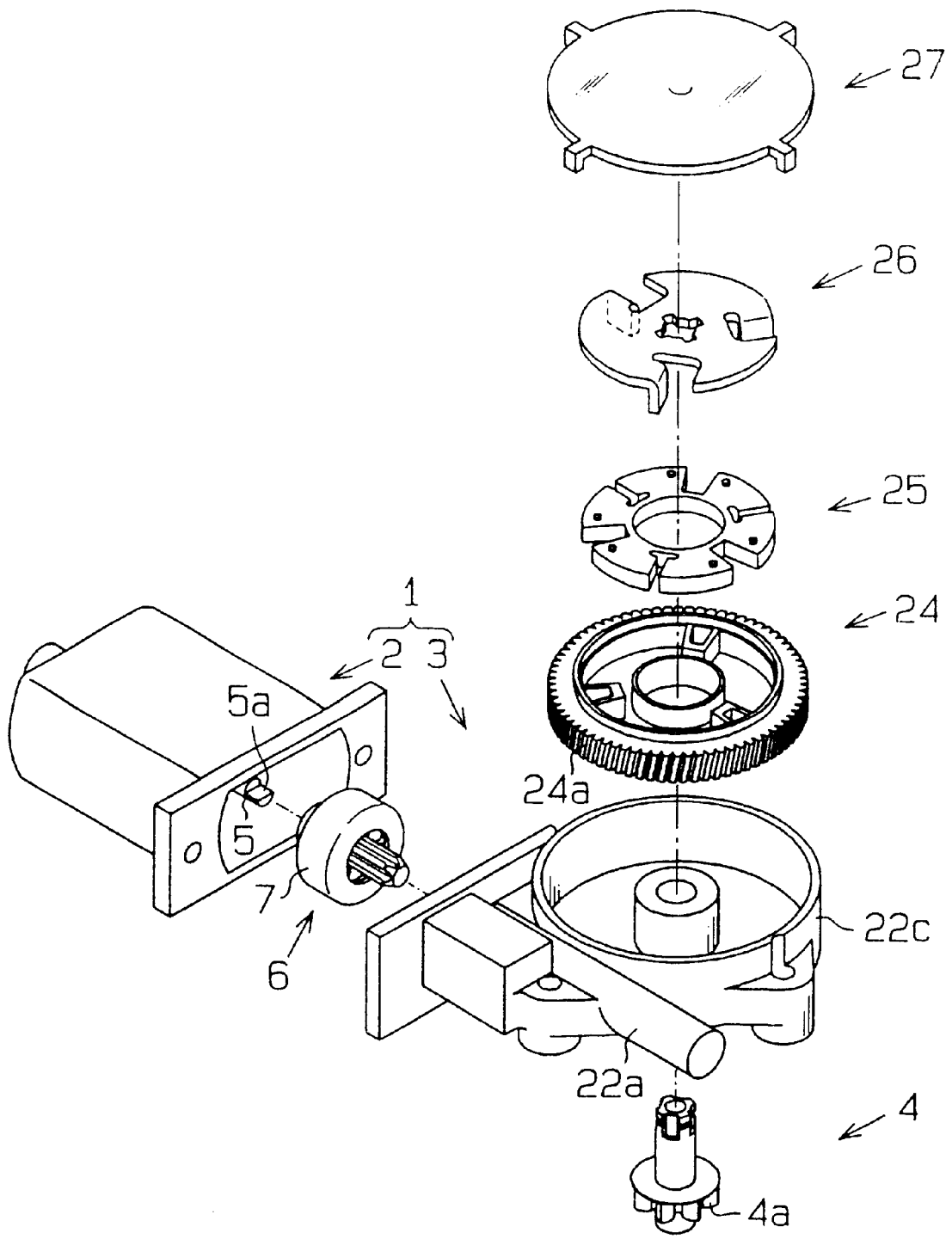
FIG. 1 is an exploded perspective view of a motor according to an embodiment of the present invention.
Figure 2:
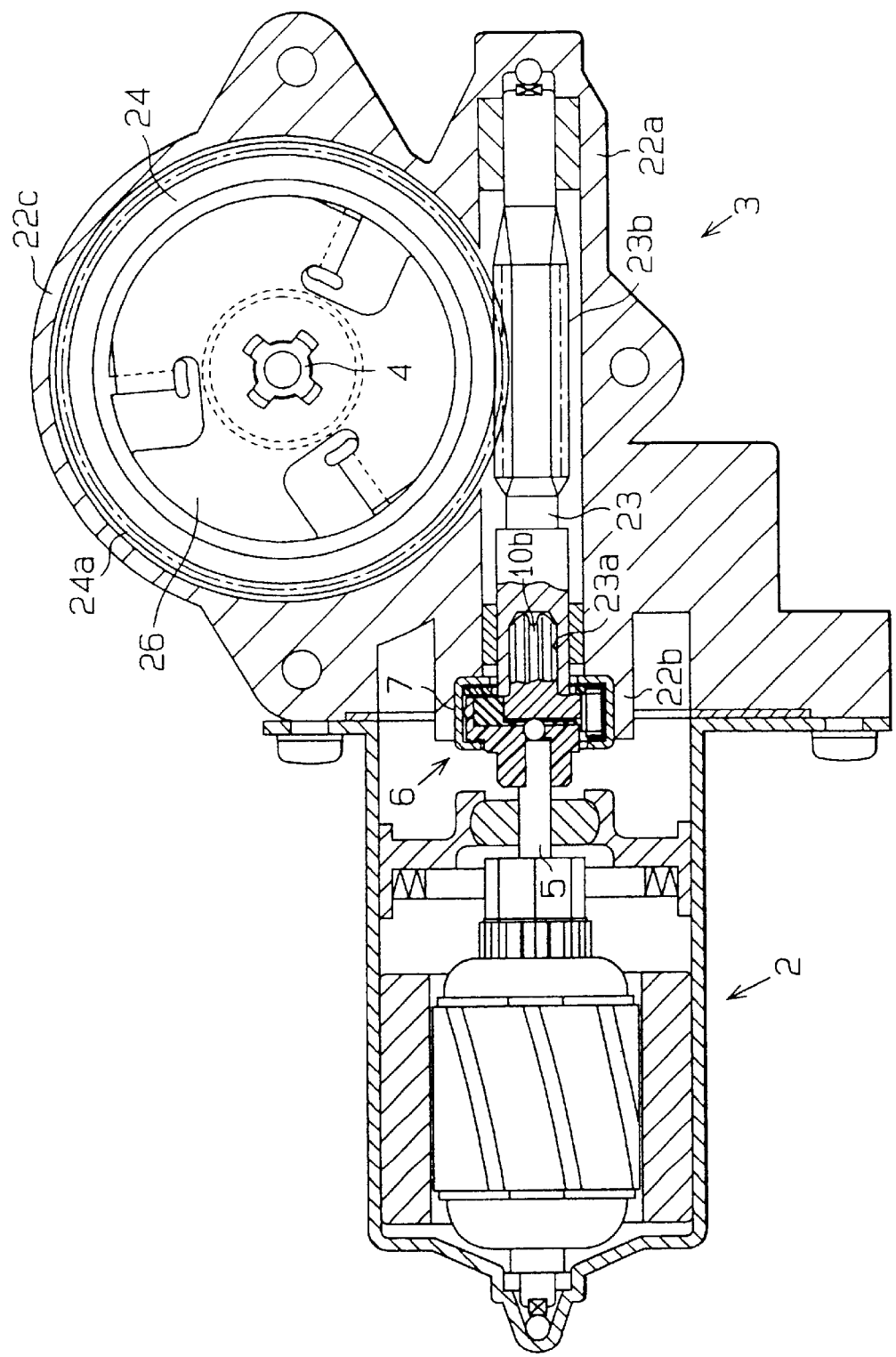
FIG. 2 is a schematic plan cross-sectional view of the motor shown in FIG. 1.

As shown in FIGS. 1 and 2, a coupling portion 5a having a generally D-shaped cross section is formed on a distal end of a rotatable shaft 5 of the motor main body 2.

Figure 3:
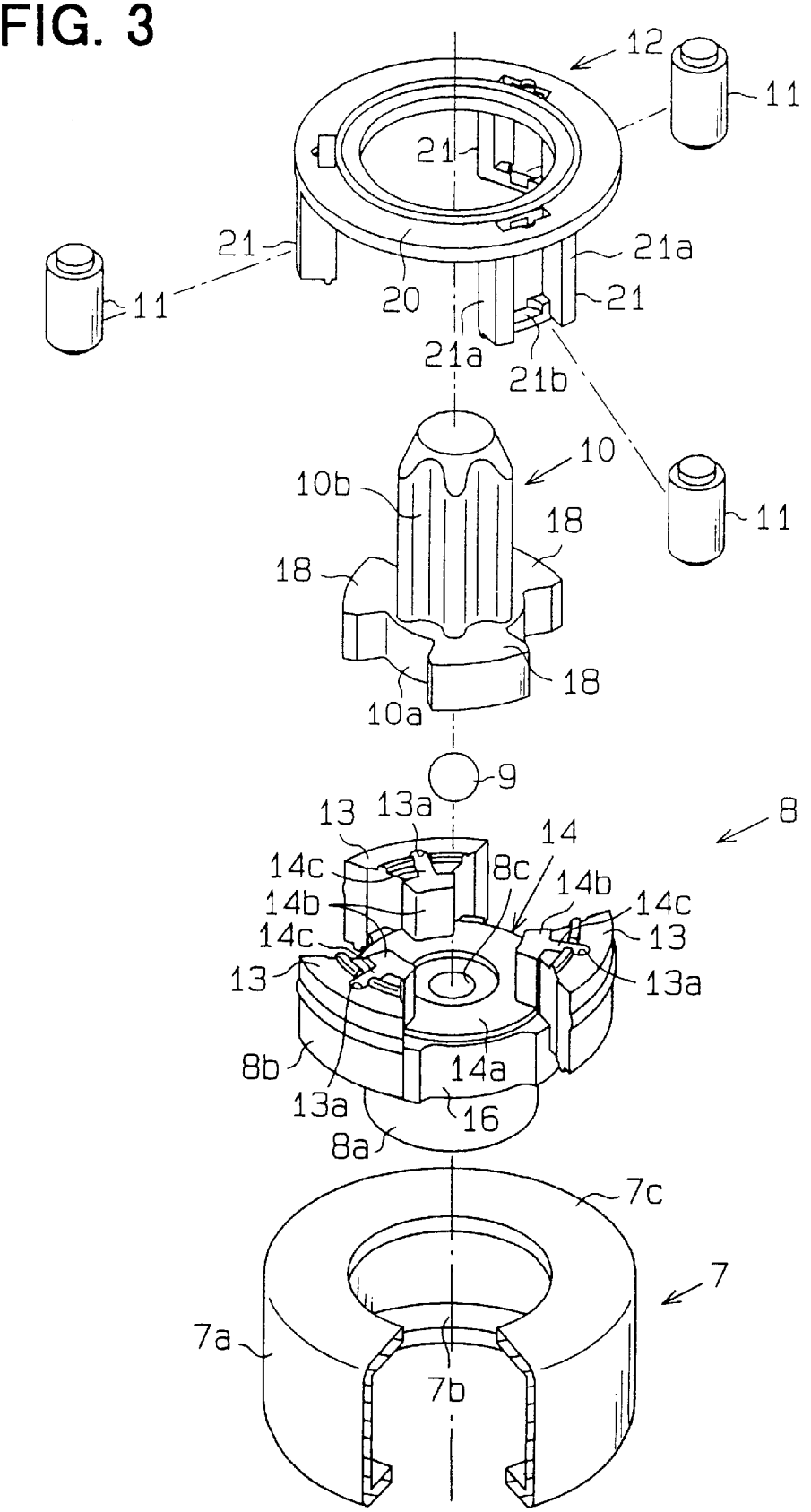
FIG. 3 is an exploded perspective view of a clutch according the embodiment.
Figure 4:
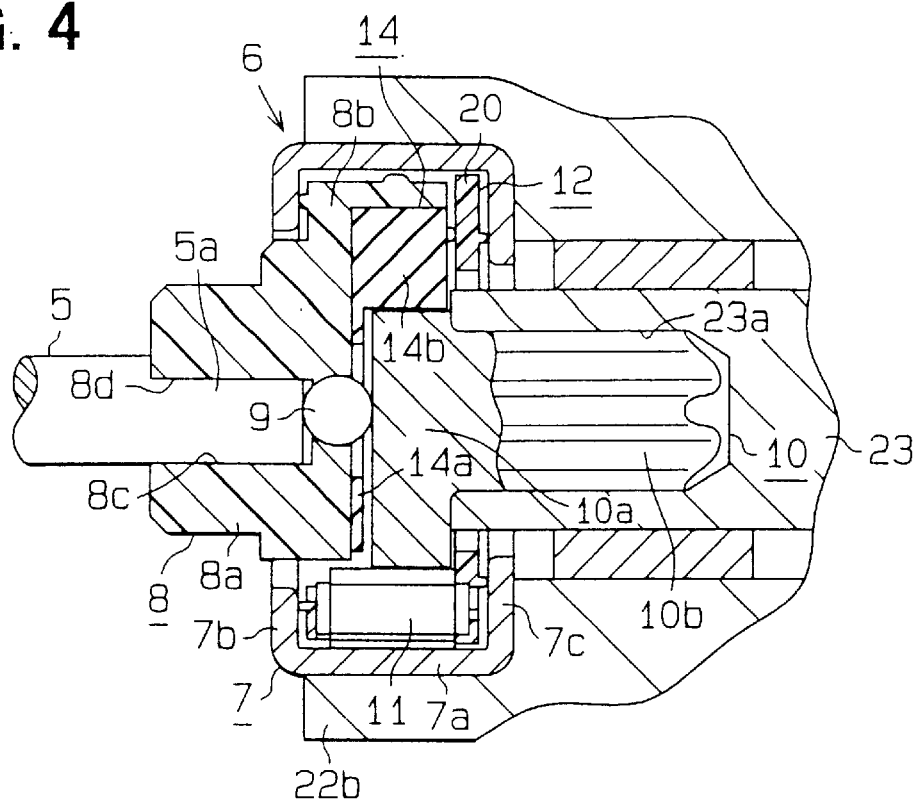
FIG. 4 is a schematic partial longitudinal cross-sectional view of the clutch according to the embodiment.

At the distal end of the motor main body 2 (rotatable shaft 5), a clutch 6 is provided. As shown in FIGS. 3 and 4, the clutch 6 includes a clutch housing 7, a driving-side rotator 8, a ball 9, a driven-side rotator 10, a plurality (three in this instance) of rolling elements 11 and a support member 12. The clutch housing 7 includes a cylindrical outer ring 7a and annular covers 7b, 7c that extend radially inward from opposing circumferential edges of the outer ring 7a, respectively. The driving-side rotator 8, the ball 9, the driven-side rotator 10, the rolling elements 11 and the support member 12 are assembled and are housed within the clutch housing 7 to constitute one functional unit (clutch 6).

The driving-side rotator 8 is made of resin material and includes a shaft 8a and a disk body 8b having a diameter larger than that of the shaft 8a. A base side (the left side of FIG. 4) of disk body 8b of the driving-side rotator 8 slides and rotates along an inner wall surface of the annular cover 7b of the clutch housing 7. A shaft center hole 8c extends through the driving-side rotator 8 along the rotational axis thereof. A coupling hole 8d having a generally D-shape cross section is formed at a base side (the left side of FIG. 4) of the shaft center hole 8c. As shown in FIG. 4, the coupling hole 8d is exposed to the exterior of the clutch housing 7 and is securely coupled with the coupling portion 5a of the rotatable shaft 5. Thus, when the rotatable shaft 5 of the motor main body 2 is rotated, the rotational force of the rotatable shaft 5 is transmitted to the driving-side rotator 8.

Furthermore, as shown in FIG. 3, a plurality (three in this instance) of generally fan-shaped protrusions 13 are arranged at the distal side (the right side of FIG. 4) of the disk body 8b. The protrusions 13 are circumferentially spaced at equal angular intervals and extend in an axial direction of the driving-side rotator 8. In each protrusion 13, a coupling groove 13a extends halfway from an inner circumferential surface of each protrusion 13 in a radially outward direction.

A cushion member 14 made of rubber material is securely coupled to the coupling groove 13a of each protrusion 13. More particularly, the cushion member 14 includes a relatively thin ring 14a and a plurality (three in this instance) of cushion segments 14b. The cushion segments 14b are spaced at equal angular intervals around an outer circumference of the ring 14a. Each cushion segment 14b has a coupling projection 14c for engaging with the coupling groove 13a on its outer circumferential side. Each coupling projection 14c is coupled with the corresponding coupling groove 13a, and the ring 14a is secured to the disk body 8b.

Figure 6:
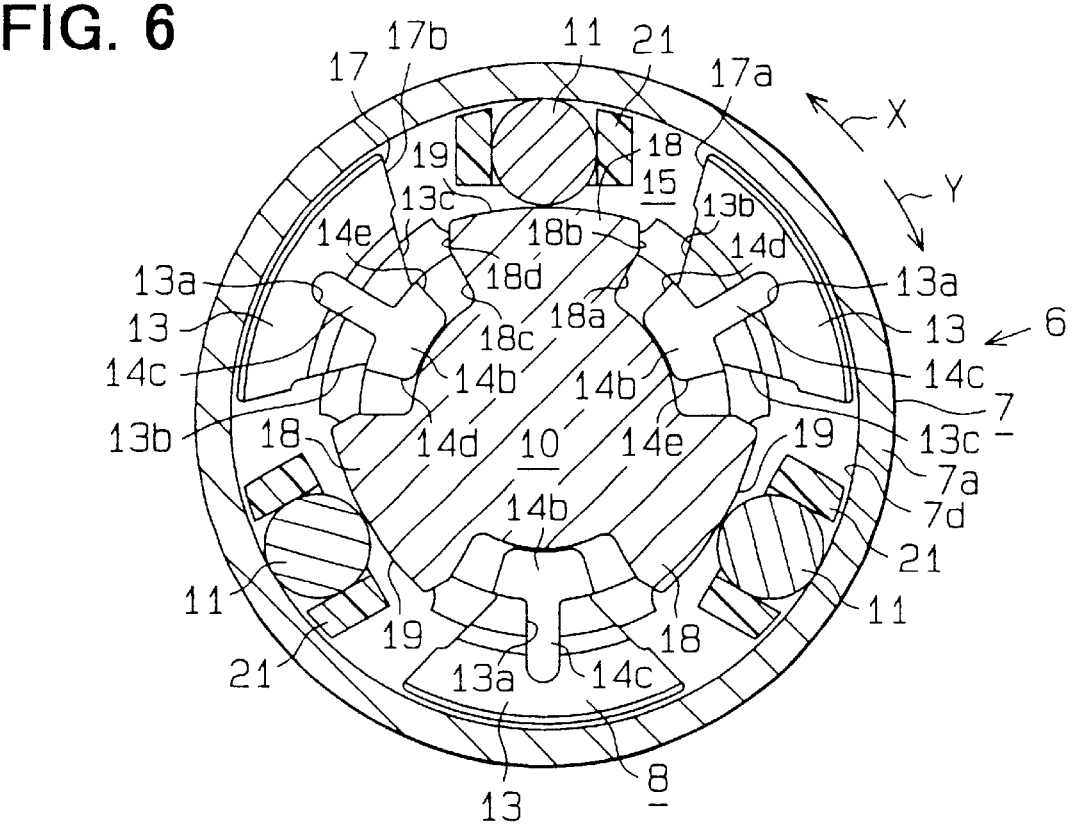
FIG. 6 is a schematic cross-sectional view of the clutch according to the embodiment.

As shown in FIG. 6, a circumferential width of each cushion segment 14b is slightly longer than a circumferential width of an inner circumferential surface of the corresponding protrusion 13. A plurality (three in this instance) of engaging slots 15 are formed at equal angular intervals. Each engaging slot 15 is defined between one side surface (radially extending surface) 13b of one protrusion 13 and an opposing side surface 13c of the next protrusion 13 and also between one side surface 14d of one cushion segment 14b and an opposing side surface 14e of the next cushion segment 14b. These engaging slots 15 are communicated with each other at center side. Recesses 16 (FIG. 3) that extend in an axial direction are formed around the outer circumference of the disk body 8b between the protrusions 13. The side surfaces 13b, 13c of the protrusions 13 are slightly bulged in the circumferential direction at their outer circumferential sides to define an opening 17 of each engaging slot 15.

The ball 9 is a spherical metal having an outer diameter corresponding to an inner diameter of the shaft center hole 8c and is received in the shaft center hole 8c from a distal end opening (the right side of FIG. 4) of the shaft center hole 8c. While the ball 9 is received in the shaft center hole 8c, part of the ball 9 protrudes from the shaft center hole 8c.

The driven-side rotator 10 has a disk body 10a and a coupling body 10b that protrudes from the center of the disk body 10a toward its distal end (the right side of FIG. 4).

The disk body 10a abuts the ball 9 at its base side (the left side of FIG. 4) and is surrounded by the protrusions 13 (cushion segments 14b) in a manner that allows rotation of the disk body 10a. Furthermore, since the disk body 10a makes point contact with the ball 9, the disk body 10a can rotate smoothly.

As shown in FIGS. 3 and 6, the disk body 10a has a plurality (three in this instance) of generally fan-shaped engaging projections 18. The engaging projections 18 extend radially outward and are spaced at equal angular intervals. A circumferential width of each engaging protrusion 18 is smaller than that of the corresponding engaging slot 15, and the engaging protrusion 18 is received in the corresponding engaging slot 15.

Figure 8:
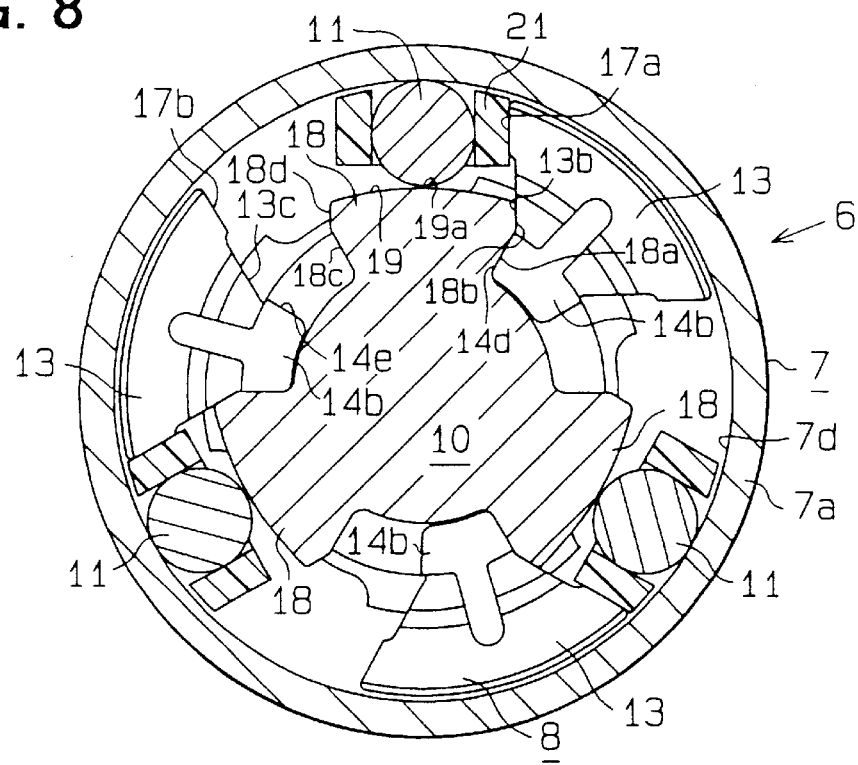
FIG. 8 is a schematic cross-sectional view of the clutch according to the embodiment.

As shown in FIG. 6, a first cushion surface 18a opposing one side surface (counter-clockwise side surface) 14d of the corresponding cushion segment 14b is formed at a radially inward region of a clockwise side surface of each engaging projection 18. Furthermore, a first engaging surface 18b opposing one side surface (counter-clockwise side surface) 13b of the corresponding protrusion 13 is formed at a radially outward region of the clockwise side surface of the engaging projection 18. The first cushion surface 18a engages the one side surface 14d of the cushion segment 14b when the driving-side rotator 8 is rotated to a predetermined position in the counter-clockwise direction (the direction of an arrow X) relative to the driven-side rotator 10. Furthermore, the first engaging surface 18b engages the one side surface 13b of the protrusion 13 when the driving-side rotator 8 is rotated beyond the predetermined position in the counter-clockwise direction (the direction of the arrow X). Since the cushion segment 14b is deformed in the circumferential direction, the driving-side rotator 8 is allowed to rotate beyond the predetermined position in the counter-clockwise direction (the direction of the arrow X), as shown in FIG. 8.

Figure 9:
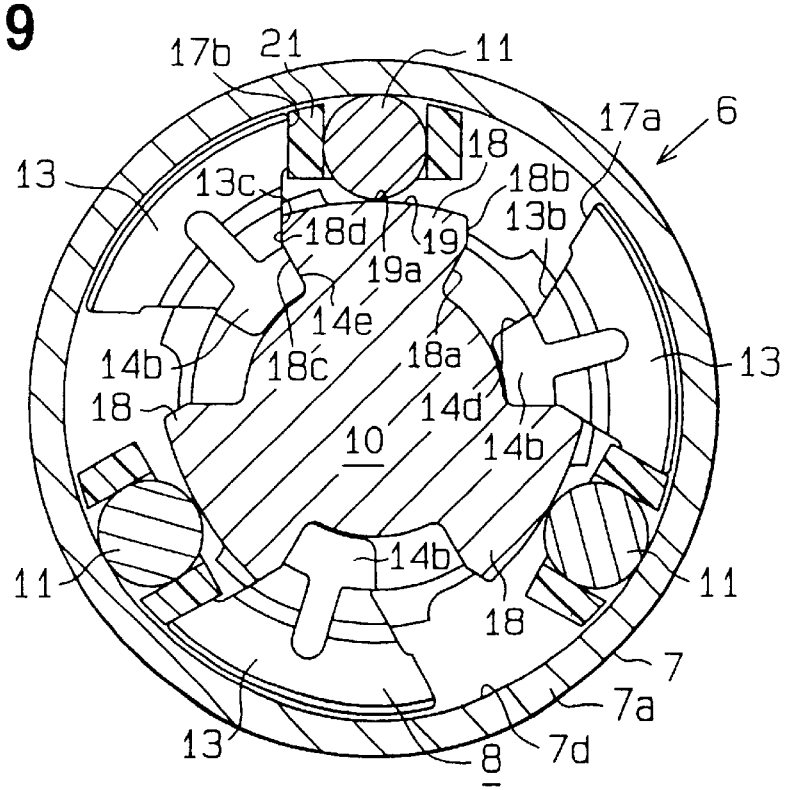
FIG. 9 is another schematic cross-sectional view of the clutch according to the present embodiment.

A second cushion surface 18c opposing the other side surface (clockwise side surface) 14e of the corresponding cushion segment 14b is formed at a radially inward region of an counter-clockwise side surface of each engaging projection 18. Furthermore, a second engaging surface 18d opposing the other side surface (clockwise side surface) 13c of the corresponding protrusion 13 is formed at a radially outward region of the counter-clockwise side surface of the engaging projection 18. The second cushion surface 18c engages the other side surface 14e of the cushion segment 14b when the driving-side rotator 8 is rotated to a predetermined position in the clockwise direction (the direction of an arrow Y) relative to the driven-side rotator 10. Furthermore, the second engaging surface 18d engages the other side surface 13c of the protrusion 13 when the driving-side rotator 8 is rotated beyond the predetermined position in the clockwise direction (the direction of the arrow Y). Since the cushion segment 14b is deformed in the circumferential direction, the driving-side rotator 8 is allowed to rotate beyond the predetermined position in the clockwise direction (the direction of the arrow Y), as shown in FIG. 9.

Figure 7:
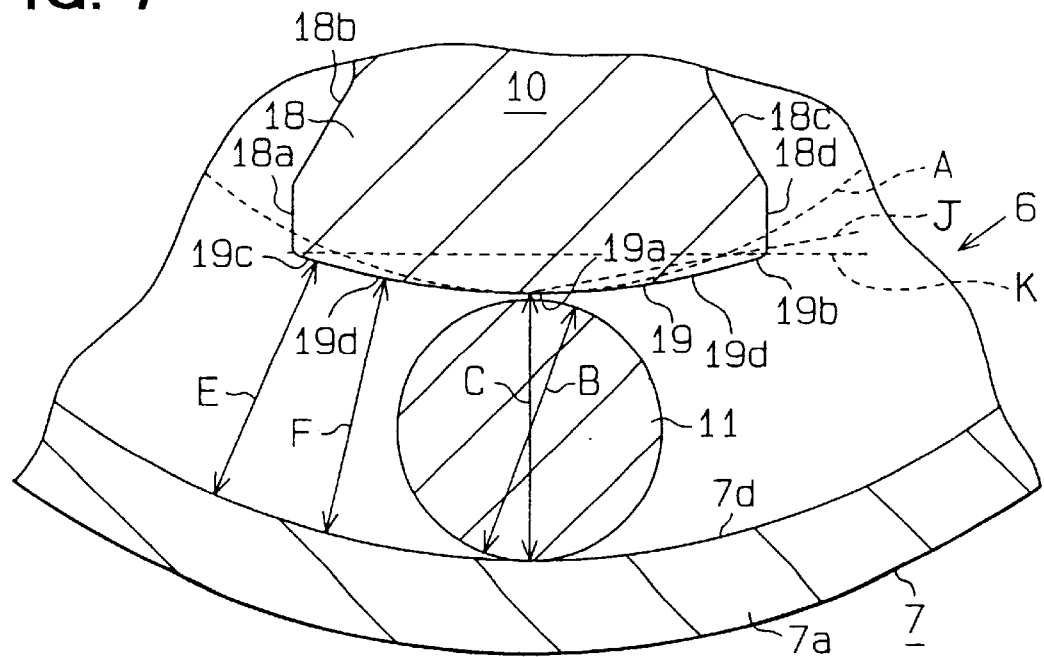
FIG. 7 is a partial schematic cross-sectional view of the clutch according to the embodiment.

A control surface 19 is formed on an outer circumferential surface of each engaging projection 18. In the present embodiment, as shown in FIG. 7, the control surface 19 is entirely arcuately bulged in a radially outward direction beyond a rotational trajectory A of a circumferential center portion 19a about the rotational axis of the driven-side rotator 10. A radius of curvature of the arcuately bulged control surface 19 is larger than that of the rotational trajectory A. Thus, in the control surface 19, the center portion 19a is located radially outward of a straight line K that connects opposing circumferential end portions 19b and 19c of the control surface 19. Furthermore, in the control surface 19, each intermediate portion 19d positioned between the center portion 19a and a respective one of the end portions 19b, 19c is arcuately bulged in a radially outward direction beyond a corresponding straight line J that connects the center portion 19a and a corresponding one of the end portions 19b, 19c.

Each rolling element 11 is a generally cylindrical body made of metal or resin material. The rolling element 11 is circumferentially positioned between a first side surface 17a and a second side surface 17b of the opening 17 and is radially positioned between the control surface 19 and the engaging projection 18 and an inner circumferential surface 7d of the outer ring 7a of the clutch housing 7.

As shown in FIG. 7, a diameter B of the rolling element 11 is smaller than a distance C between the center portion 19a of the control surface 19 and the inner circumferential surface 7d of the outer ring 7a but is longer than a distance E between each of the end portions 19b, 19c of the control surface 19 and the inner circumferential surface 7d of the outer ring 7a. Furthermore, an outer diameter B of the rolling element 11 is equal to a distance F between each intermediate portion 19d and the inner circumferential surface 7d of the outer ring 7a.

Figure 5:
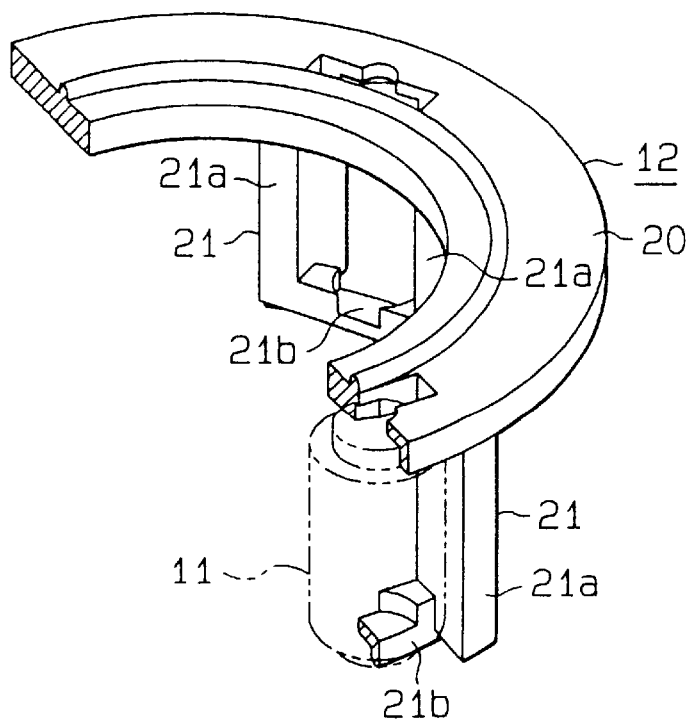
FIG. 5 is a partial perspective view of a support member of the clutch according to the embodiment.

The support member 12 is made of resin material and includes a ring plate 20 and three roller supports 21. The ring plate 20 is slidably received between the cover 7c of the clutch housing 7 and the protrusions 13 of the driving-side rotator 8. As shown in FIG. 5, the roller supports 21 extend in the axial direction from the ring plate 20 and are spaced at equal angular intervals.

Each roller support 21 includes a couple of retaining pillars 21a and a connector 21b. The retaining pillars 21a extend in the axial direction from the ring plate 20, and the connector 21b connects distal ends of the retaining pillars 21a together. In the roller support 21, a distance between the retaining pillars 21a is slightly longer than a diameter of the rolling element 11, and a distance between the ring plate 20 and the connector 21b is slightly longer than an axial length of the rolling element 11. The rolling element 11 is rotatably supported between the two retaining pillars 21a and also between the ring plate 20 and the connector 21b. Furthermore, the rolling element 11 is immovable in the circumferential direction of the ring plate 20 but is moveable in the radial direction of the ring plate 20.

In this embodiment, geometrical arrangements of the above-described components 11, 13, 18 and 21 are as follows. That is, as shown in FIG. 8, when the one side surface 13b of each protrusion 13 engages the first engaging surface 18b of the corresponding engaging projection 18, and the first side surface 17a of each opening 17 engages the corresponding roller support 21, the corresponding rolling element 11 is positioned in the center portion 19a of the control surface 19. Furthermore, as shown in FIG. 9, when the other side surface 13c of each protrusion 13 engages the second engaging surface 18d of the corresponding engaging projection 18, and the second side surface 17b of each opening 17 engages the corresponding roller support 21, the corresponding rolling element 11 is positioned in the center portion 19a of the control surface 19.

As shown in FIG. 2, a worm housing 22a of the output unit 3 has a cylindrical protrusion 22b at its base side (the left side of FIG. 2). An inner diameter of the cylindrical protrusion 22b corresponds to an outer diameter of the clutch housing 7 of the clutch 6. The clutch housing 7 is securely inserted into the cylindrical protrusion 22b.

A worm shaft 23 is received within the worm housing 22a. At the base side (the left side of FIGS. 2 and 4) of the worm shaft 23, there is formed a coupling hole 23a corresponding to the coupling body 10b of the driven-side rotator 10. The coupling body 10b is inserted within and securely coupled to the coupling hole 23a to integrally rotate therewith.

A worm 23b of the worm shaft 23 is meshed with a worm wheel 24a of a rotatable coupler 24 that is rotatably supported within a wheel housing 22c of the output unit 3. The rotatable coupler 24 is connected to an output plate 26 via a motor protective rubber 25. A base end of the output shaft 4 is non-rotatably secured to the output plate 26.

Thus, when the worm shaft 23 is rotated, the rotational force of the worm shaft 23 is transmitted to the output shaft 4 via the rotatable coupler 24, the motor protective rubber 25 and the output plate 26 to rotate the output shaft 4.

A plate cover 27 is secured to an opening of the wheel housing 22c.

The power window system (clutch 6) having the above-described construction operates as follows.

When the motor 2 is driven to rotate the rotatable shaft 5 in the counter-clockwise direction (the direction of the arrow X) of FIG. 6, the driving-side rotator 8 is rotated integrally with the rotatable shaft 5 in the same direction (the direction of the arrow X). Then, as shown in FIG. 8, when the one side surface 13b of each protrusion 13 engages the first engaging surface 18b of the corresponding engaging projection 18, and the first side surface 17a of each opening 17 engages the corresponding roller support 21, the corresponding rolling element 11 is positioned in the center portion 19a of the corresponding control surface 19 (this position is hereinafter called a "neutral position").

Prior to the engagement of the one side surface 13b of the protrusion 13 with the first engaging surface 18b, the one side surface 14d of the corresponding cushion segment 14b engages the first cushion surface 18a of the corresponding engaging projection 18 to reduce the shocks generated by the engagement.

At the neutral position, the rolling element 11 is not clamped between the control surface 19 of the engaging projection 18 and the inner circumferential surface 7d of the outer ring 7a, so that the driven-side rotator 10 having the engaging projections 18 is allowed to rotate relative to the clutch housing 7 (FIG. 7). Thus, when the driving-side rotator 8 is further rotated in the counter-clockwise direction, the rotational force of the driving-side rotator 8 is transmitted to the driven-side rotator 10 via the protrusions 13, so that the driven-side rotator 10 is rotated along with the driving-side rotator 8. During this time, the rotational force is transmitted to each rolling element 11 from the first side surface 17a of the corresponding opening 17 in the same direction (the direction of the arrow X), so that the rolling element 11 moves in the same direction.

Alternatively, when the rotatable shaft 5 is rotated in the clockwise direction (the direction of the arrow Y) of FIG. 6, each rolling element 11 is positioned in the neutral position by the protrusion 13, as shown in FIG. 9. At this position, the rolling element 11 is not clamped between the control surface 19 of the engaging projection 18 and the inner circumferential surface 7d of the outer ring 7a, so that the driven-side rotator 10 having the engaging projections 18 is allowed to rotate relative to the clutch housing 7. Thus, the rotational force of the driving-side rotator 8 is transmitted to the driven-side rotator 10 through the protrusions 13, so that the driven-side rotator 10 is rotated along with the driving-side rotator 8.

Thus, when the driven-side rotator 10 is rotated, the worm shaft 23, the rotatable coupler 24, the motor protective rubber 25, the output plate 26 and the output shaft 4 are rotated, so that the output shaft 4 drives the regulator R to open or close the window glass W.

Figure 10:
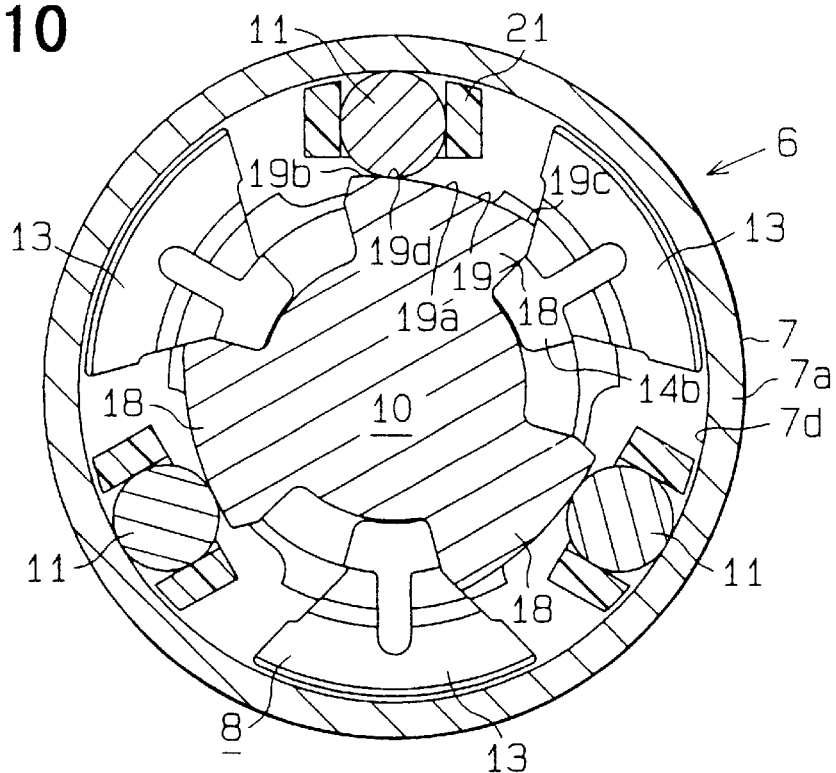
FIG. 10 is another schematic cross-sectional view of the clutch according to the present embodiment.

While the motor 1 is not driven, a load applied to the window glass W acts on the driven-side rotator 10 to rotate the same. When the driven-side rotator 10 is rotated in the clockwise direction (the direction of the arrow Y) of FIG. 6, each rolling element 11 is moved toward the end portion 19b (toward the intermediate portion 19d) of the control surface 19 of the engaging projection 18. Then, as shown in FIG. 10, when the rolling element 11 reaches the intermediate portion 19d, the rolling element 11 is clamed between the control surface 19 and the inner circumferential surface 7d of the outer ring 7a (locked state). Since the outer ring 7a is secured, the driven-side rotator 10 cannot be rotated further, so that the driving-side rotator 8 cannot be rotated by the driven-side rotator 10.

Figure 11:
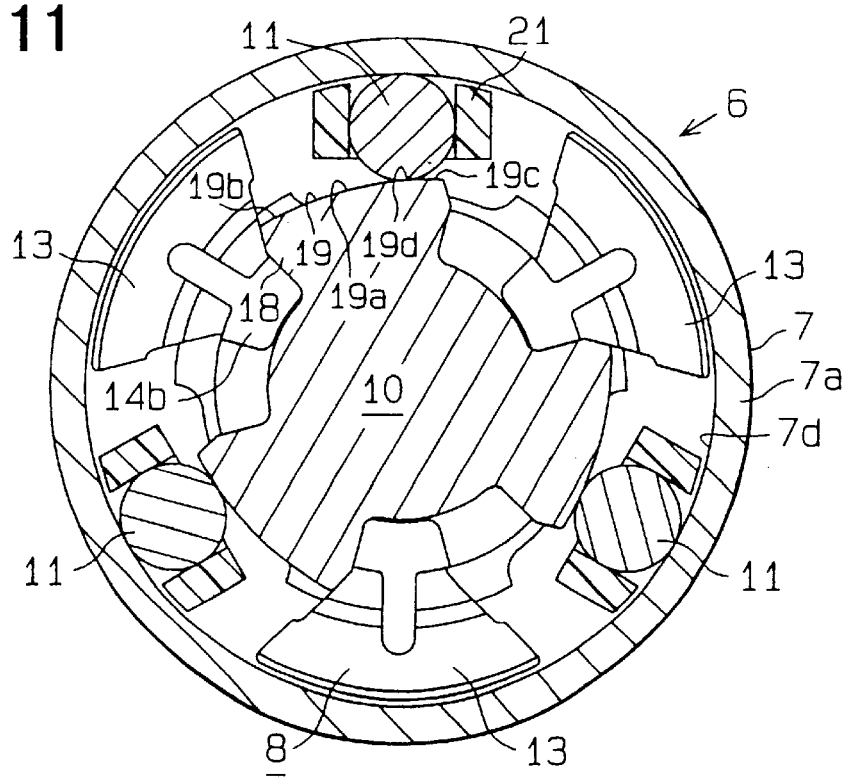
FIG. 11 is another schematic cross-sectional view of the clutch according to the present embodiment.

When the driven-side rotator 10 is rotated in the counter-clockwise direction (the direction of the arrow X) of FIG. 6, on the other hand, the driving-side rotator 8 is stopped. Each rolling element 11 is moved toward the end portion 19c (toward the intermediate portion 19d) of the control surface 19 of the corresponding engaging projection 18. Then, when the rolling element 11 reaches the intermediate portion 19d, as shown in FIG. 11, the rolling element 11 is clamped between the control surface 19 and the inner circumferential surface 7d of the outer ring 7a (locked state). Since the outer ring 7a is secured, the driven-side rotator 10 cannot be rotated further, so that the driving-side rotator 8 cannot be rotated by the driven-side rotator 10.

As described above, even if a large load is applied to the window glass W, the window glass W is not opened since the rotation of the driven-side rotator 10 is prevented.

Characteristic advantages of the above-described embodiment will be described below.

(1) In the control surface 19, the center portion 19a is positioned radially outward of the straight line K connecting the opposing end portions 19b, 19c, and/or each intermediate portion 19d positioned between the center portion 19a and the respective one of the end portions 19b, 19c is arcuately bulged in a radially outward direction beyond the corresponding straight line J that connects the center portion 19a and the corresponding one of the end portions 19b, 19c. Thus, a radial gap between the center portion 19a of the control surface 19 and the rolling element 11 as well as a radial gap between the rolling element 11 and the inner circumferential surface 7d of the outer ring 7 (i.e. difference between the diameter B of the rolling element 11 and the distance C) can be minimized, allowing reduction of noises generated therefrom. Furthermore, when the intermediate portion 19d of the control surface 19 urges the rolling element 11 against the inner circumferential surface 7d of the outer ring 7a, a radially outwardly directed force component of the urging force exerted from the intermediate portion 19d is increased. Thus, there is less chance of the rolling element 11 being not clamped between the control surface 19 and the inner circumferential surface 7d of the outer ring 7a (i.e., the rolling element being more securely locked). That is, the transmission of the rotational force of the driven-side rotator 10 to the driving-side rotator 8 is prevented.

(2) The control surface 19 is entirely arcuately bulged. The arcuately bulged control surface 19 has a radius of curvature greater than that of the rotational trajectory A of the center portion 19a of the control surface 19 about the rotational axis of the driven-side rotator 10. With this arrangement, the corresponding rolling element 11 can move smoothly along the control surface 19.

(3) Each rolling element 11 has the generally cylindrical shape extending parallel to the central axis of the outer ring 7a, so that the outer circumferential surface of the rolling element 11 has line contact with both the inner circumferential surface 7d of the outer ring 7a and the control surface 19 while being clamped between them. In this way, the rotation of the driven-side rotator 10 can be more securely prevented.

(4) Each cushion segment 14b of the cushion member 14 reduces the shocks resulting from engagement of the one side surface 13b of each protrusion 13 to the first engaging surface 18b of the corresponding engaging projection 18.

(5) The positional relationship among the rolling elements 11 is maintained by the support member 12. Rattling of each rolling element 11 can be effectively prevented by the support member 12, and thereby the vibrations and noises induced by the rattling of the rolling element 11 can be prevented.

(6) The clutch 6 is arranged between the rotatable shaft 5 of the motor main body 2 and the worm shaft 23. This arrangement allows reduction of the required strength of the clutch 6. Thus, the size of the clutch can be reduced, allowing reduction of the manufacturing cost.

The above-described embodiment can be modified as follows.

(a) Each control surface 19 of the above-described embodiment can be changed to any shape as long as it satisfies the following conditions: the distance between the outer ring 7a and the control surface 19 decreases from the center portion 19a toward the opposing end portions 19b, 19c; the center portion 19a is positioned radially outward of the straight line K connecting the end portions 19b, 19c; and each intermediate portion 19d is arcuately bulged in the radially outward direction beyond the straight line J connecting the center portion 19a and the corresponding end portion 19b or 19c.

Figure 13:
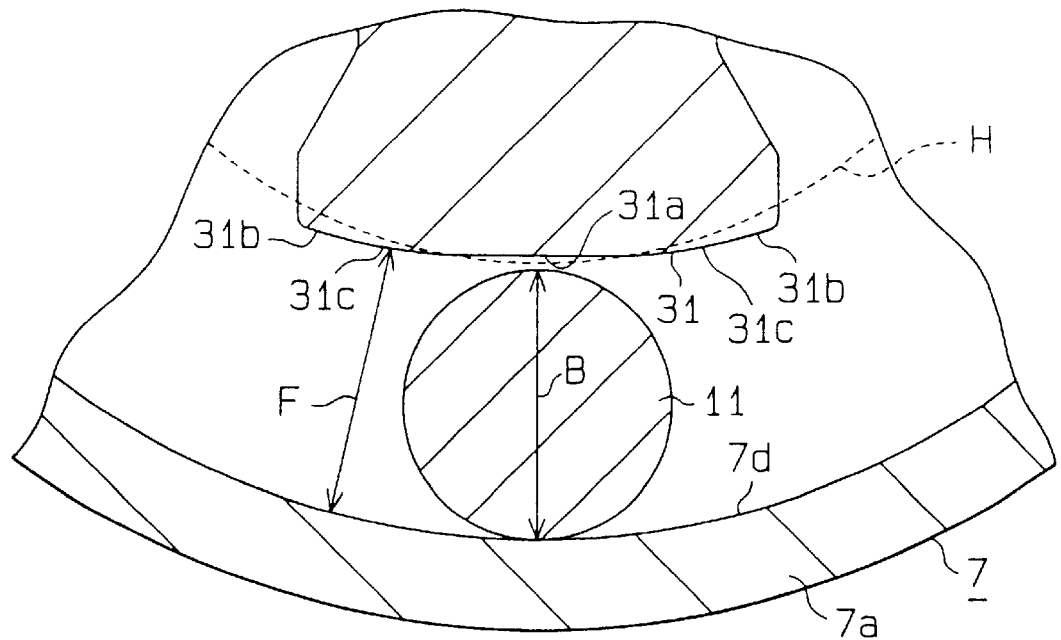
FIG. 13 is a partial cross-sectional view illustrating a modification of the clutch.

(b) Each control surface 19 can be changed to a control surface 31 shown in FIG. 13. In the control surface 31, the center portion 31a is generally flat. Each intermediate portion 31c between the center portion 31a and the corresponding end portion 31b of the control surface 31 is arcuately bulged toward the outer ring 7a beyond the rotational trajectory H of the center portion 31a about the rotational axis of the driven-side rotator, and the arcuately bulged intermediate portion 31c has a radius of curvature larger than that of the rotational trajectory H. The diameter B of the rolling element 11 is substantially equal to a distance F between the intermediate portion 31c and the inner circumferential surface 7d of the outer ring 7a. Even if such a change is made, the advantages (1) and (3)–(6) of the above-described embodiment can be achieved.

Figure 14:
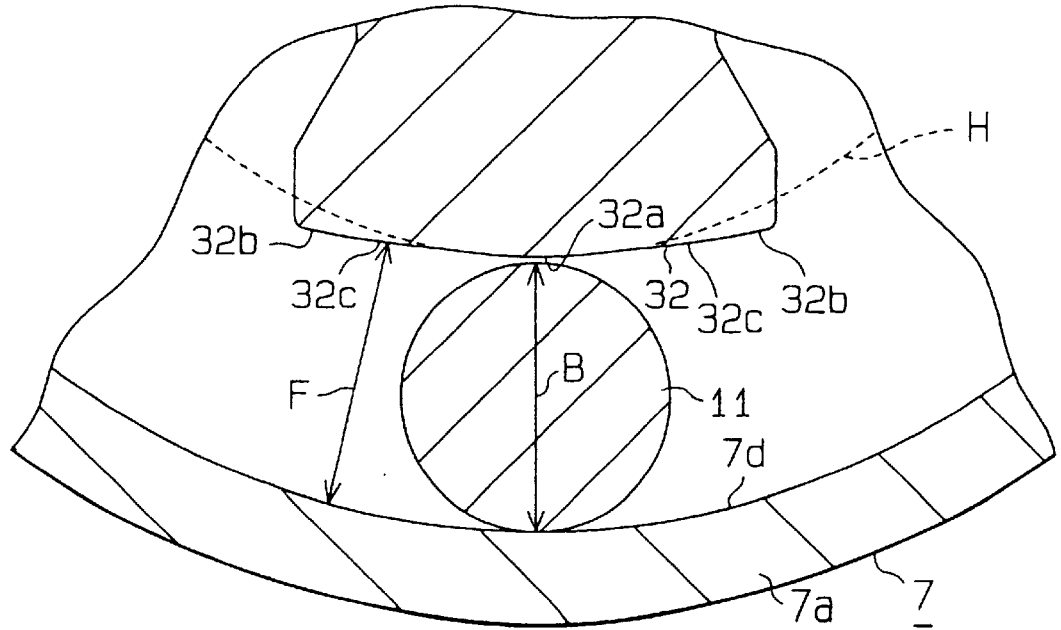
FIG. 14 is another partial cross-sectional view illustrating another modification of the clutch.

(c) Each control surface 19 can be changed to a control surface 32 shown in FIG. 14. The control surface 32 differs from the control surface 31 only in that the center portion 32a is arcuately bulged to overlap onto the rotational trajectory H. In other words, the arcuately bulged center portion 32a is coaxial with the inner circumferential surface 7d of the outer ring 7a. The diameter B of the rolling element 11 is substantially equal to the distance F between the intermediate portion 32c (located between the center portion 32a and the corresponding end portion 32b) and the inner circumferential surface 7d of the outer ring 7a. Even if such a change is made, the advantages (1) and (3)–(6) of the above-described embodiment can be achieved.

Figure 15:
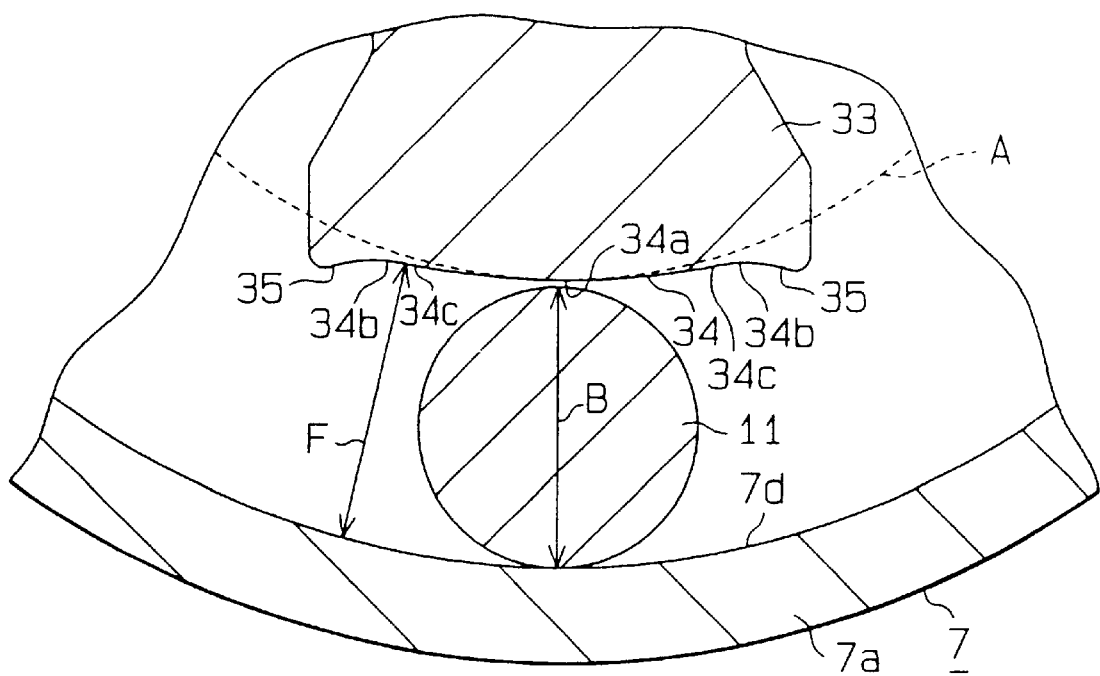
FIG. 15 is another partial cross-sectional view illustrating another modification of the clutch.

(d) Each engaging projection 18 of the above-described embodiment can be changed to an engaging projection 33 shown in FIG. 15. The engaging projection 33 includes a control surface 34 similar to the control surface 19 along its outer circumferential surface. The engaging projection 33 has opposing circumferential end portions that are bulged toward the outer ring 7a to form bulged portions 35. The bulged portions 35 act as retainer portions that prevent the rolling element 11 to move out from the space between the inner circumferential surface 7d of the outer ring 7a and the control surface 34. The diameter B of the rolling element 11 is substantially equal to the distance F between the intermediate portion 34c (located between the center portion 34a and the corresponding end portion 34b) and the inner circumferential surface 7d of the outer ring 7a. Even if such a change is made, the advantages similar to those of the above-described embodiment can be achieved. Furthermore, even if the rolling element 11 tends to escape from the space between the inner circumferential surface 7d of the outer ring 7a and the control surface 34, for example, by slightly flexing each relevant component, the bulged portions 35 can effectively prevent it.

(e) In the above-described embodiment, although each rolling element 11 is generally cylindrically shaped, the rolling element 11 can be generally spherically shaped. Even if such a change is made, the advantages (1), (2) and (4)–(6) of the above-described embodiment can be achieved. Furthermore, since the contact between the generally spherical rolling element and the inner circumferential surface 7d of the outer ring 7a is minimized, frictional noises generated therebetween are further reduced.

(f) The cushion member 14 of the above-described embodiment can be changed to any other form as long as the shocks, which are generated when the one side surface 13b (or the other side surface 13c) engages the first engaging surface 18b (or the second engaging surface 18d), can be reduced. For instance, the cushion segments 14b can be implemented as separate members. Even if such a change is made, the advantages similar to those of the above-described embodiment can be achieved. Alternatively, the cushion member 14 can be omitted. Even if such a change is made, the advantages similar to the advantages (1)–(3), (5) and (6) of the above-described embodiment can be achieved.

(g) The support member 12 of the above-described embodiment can be changed to any form as long as the positional relationship among the rolling elements 11 can be maintained. Even if such a change is made, the advantages similar to those of the above-described embodiment can be achieved. Alternatively, the support member 12 can be omitted. Even if such a change is made, the advantages similar to the advantages (1)–(4) and (6) can be achieved.

(h) In the above-described embodiment, although the three rolling elements 11 are provided, the number of the rolling elements 11 can be any number as long as a plurality of the rolling elements 11 are present. In such a case, the number of the engaging slots 15 and the number of the engaging projections 18 need only be equal to or greater than the number of the rolling elements 11.

(i) In the above-described embodiment, although the clutch 6 is arranged between the rotatable shaft 5 of the motor main body 2 and the worm shaft 23 in the motor 1, the clutch 6 can be alternatively arranged between the rotatable coupler 24 and the output shaft 4. Alternatively, the clutch 6 can be arranged between the worm wheel 24a and the load.

Even if such a change is made, the advantages similar to the advantages (1)–(5) of the above-described embodiment can be achieved. Furthermore, the transmission of the rotational force form the load to the motor main body 2 acting as the drive source is prevented at the point that is closer to the load than the rotatable shaft 5 of the motor main body 2.

Although the clutch 6 of the above-described embodiment is provided for the motor 1, the clutch 6 can be provided for any other suitable devices. Furthermore, although the motor 1 is provided for the power window system, the motor 1 can be provided for any other suitable devices.

Additional advantages and modifications will readily occur to those skilled in the art. The invention in its broader terms is therefore, not limited to the specific details, representative apparatus, and illustrative examples shown and described.

What is claimed is:

1. A clutch comprising:
   an outer ring that is non-rotatably secured and has an inner circumferential surface;
   a driving-side rotator that is connected to a drive source and is rotatably received within said outer ring, wherein said driving-side rotator includes an engaging slot that has an opening at its outer circumferential side;
   a driven-side rotator that is connected to a load and is rotatably received within said outer ring, wherein said driven-side rotator includes an engaging projection, which engages said engaging slot to limit relative rotation of said driving-side rotator within a predetermined range and which has a control surface opposing said inner circumferential surface of said outer ring at its outer circumferential wall surface; and
   a rolling element that is located between said inner circumferential surface of said outer ring and said control surface in said opening and that has an outer diameter shorter than a distance between a circumferential center portion of said control surface and said inner circumferential surface of said outer ring but longer than a distance between each of opposing circumferential end portions of said control surface and said inner circumferential surface of said outer ring,
   wherein said circumferential center portion of said control surface is located radially outward of a straight line that connects said opposing circumferential end portions of said control surface.

2. A clutch according to claim 1, wherein each intermediate portion positioned between said circumferential center portion and a respective one of said circumferential end portions is arcuately bulged in a radially outward direction beyond a corresponding straight line that connects said circumferential center portion and a corresponding one of said circumferential end portions.

3. A clutch according to claim 2, wherein said control surface is entirely arcuately bulged, wherein said arcuately bulged control surface has a radius of curvature greater than that of a rotational trajectory of said circumferential center portion of said control surface about a rotational axis of said driven-side rotator.

4. A clutch according to claim 2, wherein said circumferential center portion of said control surface is flat.

5. A clutch according to claim 2, wherein said circumferential center portion of said control surface is arcuate, wherein said arcuate circumferential center portion is coaxial with said inner circumferential surface of said outer ring.

6. A clutch according to claim 2, wherein each said circumferential end portion of said control surface of said engaging projection has a retainer portion that prevents said rolling element to move out from a space between said inner circumferential surface of said outer ring and said control surface.

7. A clutch according to claim 2, wherein:
   when said driving-side rotator is rotated by a rotational force transmitted from said drive source, an inner sidewall surface of said opening urges said rolling element to substantially position said rolling element in said circumferential center portion of said control surface and transmits said rotational force of said driving-side rotator from said engaging slot to said driven-side rotator through said engaging projection; and
   when said driven-side rotator is rotated by a rotational force transmitted from said load, said control surface urges said rolling element to clamp said rolling element between said inner circumferential surface of said outer ring and said control surface to prevent rotation of said driven-side rotator.

8. A clutch according to claim 2, wherein said outer diameter of said rolling element is equal to a distance between said each intermediate portion of said control surface and said inner circumferential surface of said outer ring, so that when said driven-side rotator is rotated by said rotational force transmitted from said load, said rolling element is clamped between either one of said intermediate portions of said control surface and said inner circumferential surface of said outer ring.

9. A clutch according to claim 8, wherein said rolling element makes line contact with said inner circumferential surface of said outer ring and also with said intermediate portion of said control surface when said rolling element is clamped between said intermediate portion of said control surface and said inner circumferential surface of said outer ring.

10. A motor comprising a clutch according to claim 2.

11. A clutch comprising:
    an outer ring that is non-rotatably secured and has an inner circumferential surface;
    a driving-side rotator that is connected to a drive source and is rotatably received within said outer ring;
    a driven-side rotator that is connected to a load and is rotatably received within said outer ring, wherein said driven-side rotator is connected to said driving-side rotator in a manner allowing relative rotation of said driven-side rotator within a predetermined range in a rotational direction and has a control surface opposing said inner circumferential surface of said outer ring at its outer circumferential surface; and
    a rolling element located between said control surface of said driven-side rotator and said inner circumferential surface of said outer ring, wherein said rolling element is smaller than a distance between a circumferential center portion of said control surface and said inner circumferential surface of said outer ring but larger than a distance between each of opposing circumferential end portions of said control surface and said inner circumferential surface of said outer ring and is positionable between a clamped position where said rolling element is clamped between said control surface of said driven-side rotator and said inner circumferential surface of said outer ring and a non-clamped position where said rolling element is not clamped between said control surface of said driven-side rotator and said inner circumferential surface of said outer ring, wherein each intermediate portion positioned between said circumferential center portion and a respective one of said circumferential end portions is arcuately bulged in a radially outward direction beyond a corresponding straight line that connects said circumferential center portion and a corresponding one of said circumferential end portions.

12. A clutch according to claim 11, wherein said circumferential center portion of said control surface is located radially outward of a straight line that connects said opposing circumferential end portions of said control surface.

13. A clutch according to claim 12, wherein:
a plurality of rolling elements is provided around a rotational axis of said driving-side rotator; and
wherein each of said rolling elements is positioned in said clamped position when said driven-side rotator is rotated in either a first or second rotational direction.

14. A clutch according to claim 12, wherein said control surface is provided for each of said rolling elements.

15. A clutch according to claim 12, wherein each said rolling element is made of resin material.

16. A clutch according to claim 12, wherein said outer diameter of said rolling element is equal to a distance between said each intermediate portion of said control surface and said inner circumferential surface of said outer ring.

17. A clutch according to claim 16, wherein said circumferential center portion of said control surface is flat.

18. A clutch according to claim 16, wherein:
said circumferential center portion of said control surface is arcuate, wherein said arcuate circumferential center portion is coaxial with said inner circumferential surface of said outer ring.

19. A clutch according to claim 12, wherein:
when said driving-side rotator is rotated by a rotational force transmitted from said drive source, said driving-side rotator causes said rolling element to be positioned in said non-clamped position and to be rotated along with said driving-side rotator, and said driving-side rotator engages said driven-side rotator in said rotation direction to transmit said rotational force of said driving-side rotator to said driven-side rotator; and
when said driven-side rotator is rotated by a rotational force transmitted from said load, said rolling element is positioned in said clamped position, and rotation of said driven-side rotator is allowed or prevented while providing a desired frictional force between said rolling element and said inner circumferential surface of said outer ring.

20. A motor comprising a worm shaft, a rotatable shaft and a clutch according to claim 12, wherein said clutch is arranged between said worm shaft and said rotatable shaft.

* * * * *